No. 742,495. PATENTED OCT. 27, 1903.
A. A. ROOT.
COMBINED ADVERTISING AND CHECK PROTECTING DEVICE.
APPLICATION FILED AUG. 11, 1902.
NO MODEL. 4 SHEETS—SHEET 1.

Witnesses.
L. M. Sangster.
Geo. A. Neubauer.

Inventor.
Albert A. Root.
By A. J. Sangster
Attorney.

No. 742,495. PATENTED OCT. 27, 1903.
A. A. ROOT.
COMBINED ADVERTISING AND CHECK PROTECTING DEVICE.
APPLICATION FILED AUG. 11, 1902.
NO MODEL. 4 SHEETS—SHEET 2.

Witnesses.
L. M. Sangster.
Geo. A. Neubauer.

Inventor.
Albert A. Root,
By A. J. Sangster
Attorney.

No. 742,495. PATENTED OCT. 27, 1903.
A. A. ROOT.
COMBINED ADVERTISING AND CHECK PROTECTING DEVICE.
APPLICATION FILED AUG. 11, 1902.
NO MODEL. 4 SHEETS—SHEET 3.
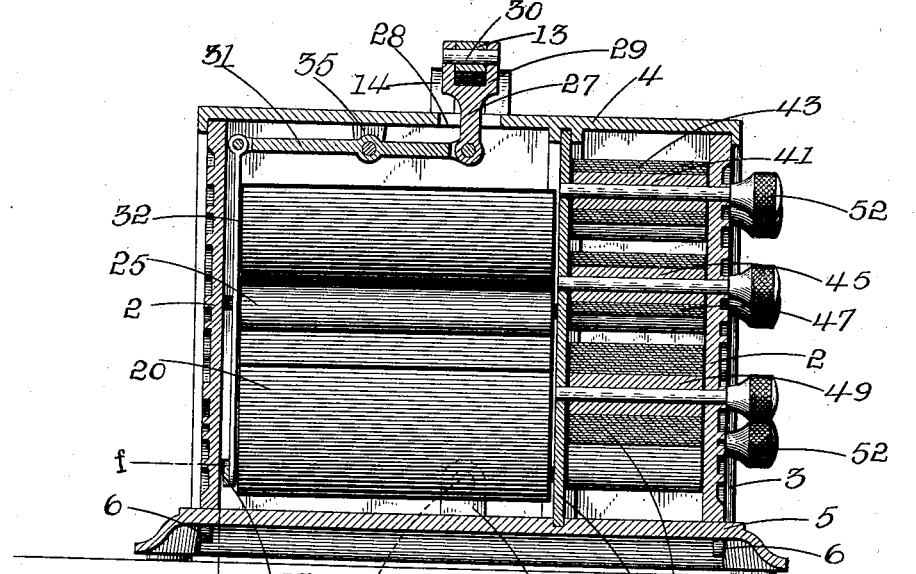
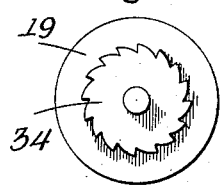
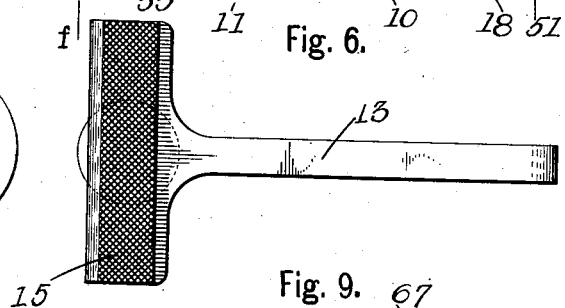
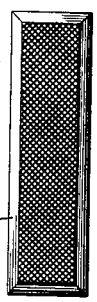
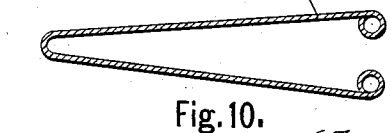
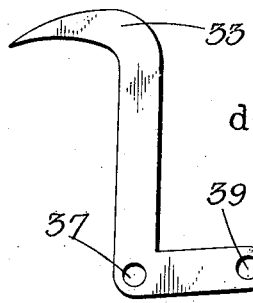
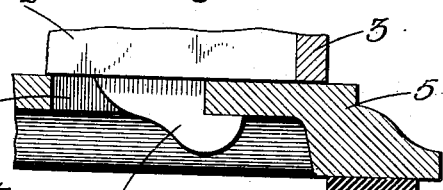
Witnesses.
L. M. Sangster
Geo. A. Neubauer.
Inventor.
Albert A. Root.
By A. J. Sangster
Attorney.

No. 742,495. PATENTED OCT. 27, 1903.
A. A. ROOT.
COMBINED ADVERTISING AND CHECK PROTECTING DEVICE.
APPLICATION FILED AUG. 11, 1902.
NO MODEL. 4 SHEETS—SHEET 4.

Witnesses. Inventor.
L. M. Sangster. Albert A. Root.
Geo. A. Neubauer. By A. J. Sangster.
Attorney.

No. 742,495.

Patented October 27, 1903.

UNITED STATES PATENT OFFICE.

ALBERT A. ROOT, OF BUFFALO, NEW YORK.

COMBINED ADVERTISING AND CHECK-PROTECTING DEVICE.

SPECIFICATION forming part of Letters Patent No. 742,495, dated October 27, 1903.

Application filed August 11, 1902. Serial No. 119,209. (No model.)

*To all whom it may concern:*

Be it known that I, ALBERT A. ROOT, a citizen of the United States, residing at Buffalo, in the county of Erie and State of New York, have invented a certain new and useful Improvement in a Combined Advertising and Check-Protecting Device, of which the following is a specification.

This invention relates to an improved combined advertising and check-protecting device in which the advertisements are changed by the operation of the check-protecting device.

The object of the invention is to construct a comparatively simple, cheap, and neat device of the above character.

The invention also relates to certain details of construction, all of which will be fully and clearly hereinafter described and claimed, reference being had to the accompanying drawings, in which—

Figure 1:
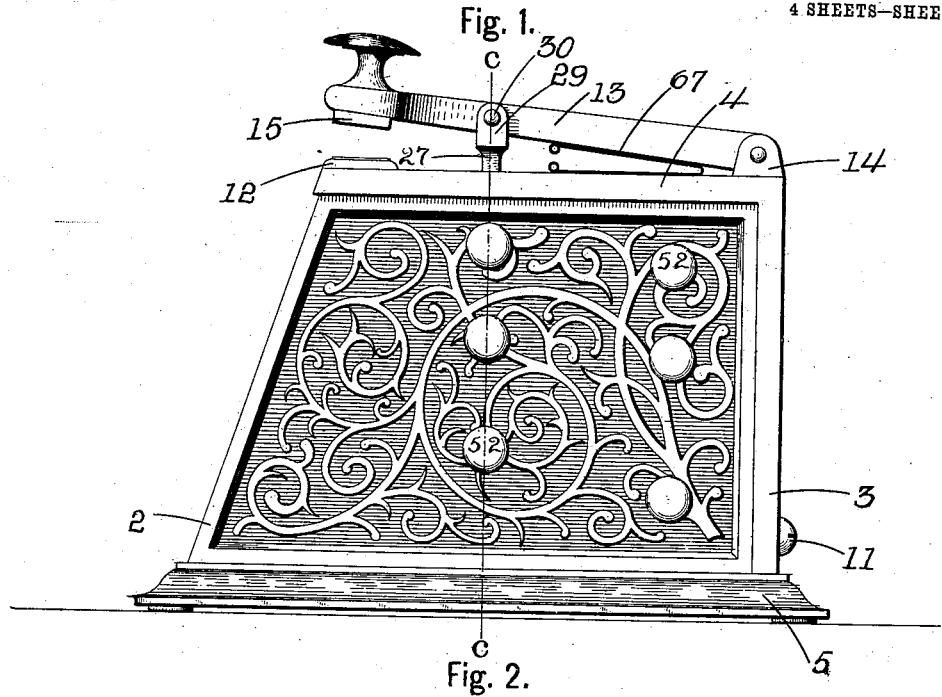
Figure 2:
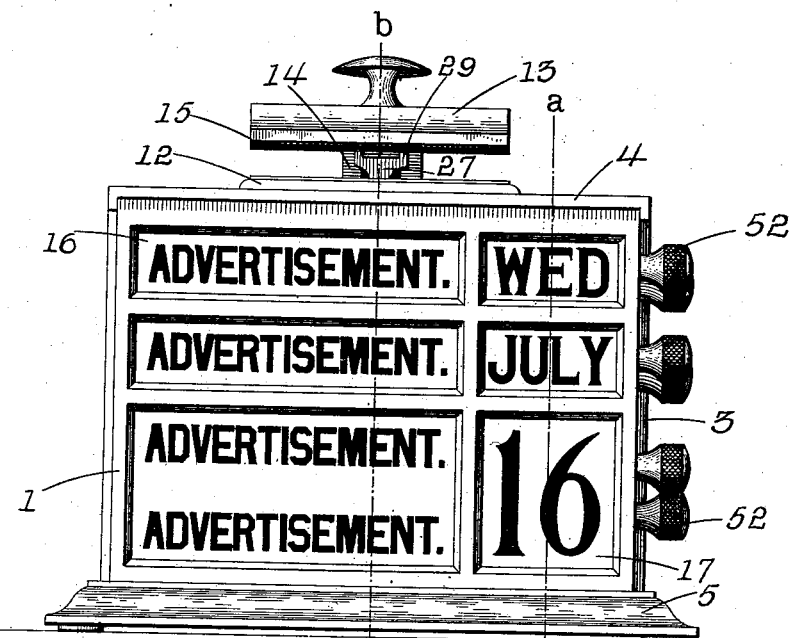
Figure 3:
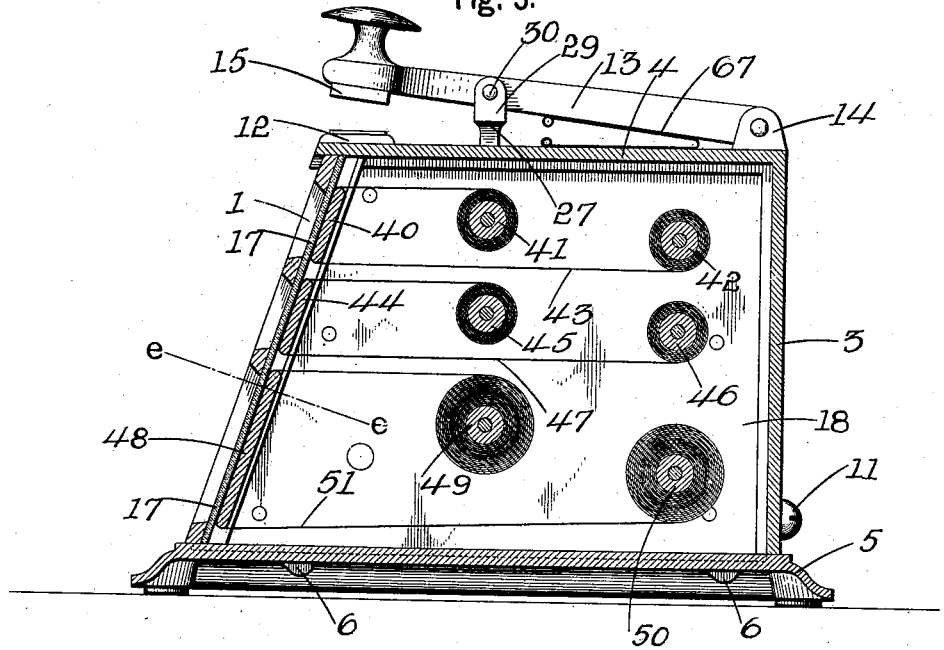
Figure 4:
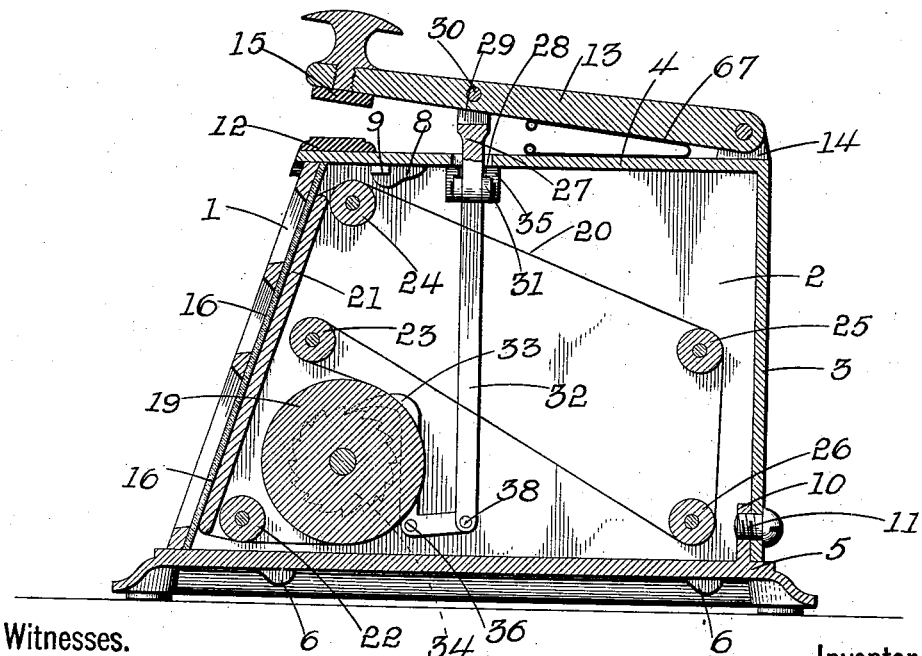
Figure 14:
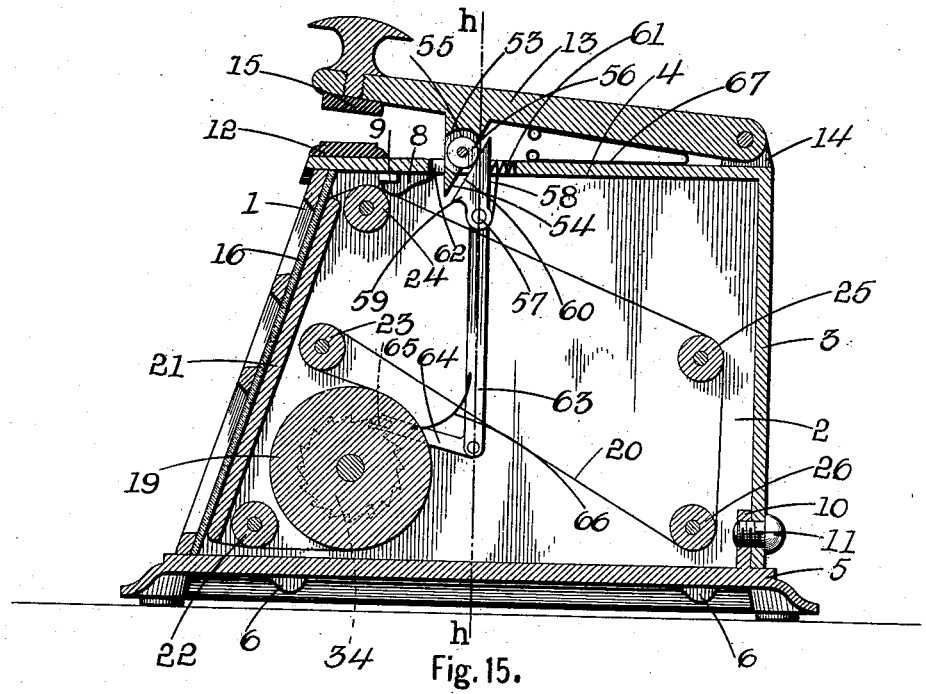
Figure 15:
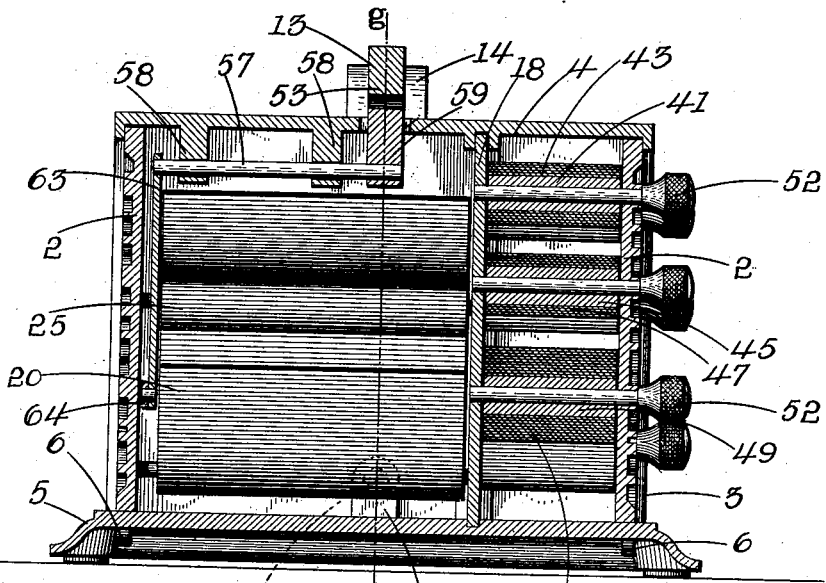

Figure 1 is a side elevation of one form of the improved device. Fig. 2 is a front elevation. Fig. 3 is a vertical longitudinal section on line $a\,a$, Fig. 2. Fig. 4 is a vertical longitudinal section on line $b\,b$, Fig. 2. Fig. 5 is a vertical transverse section on line $c\,c$, Fig. 1. Fig. 6 is a detached bottom view of the movable member or lever of the check-protecting mechanism. Fig. 7 is a detached view of the large ratchet-roller. Fig. 8 is a detached top view of the fixed member of the check-protecting mechanism. Fig. 9 is an enlarged detached section through the spring for normally maintaining the movable member in its elevated position on line $d\,d$, Fig. 10. Fig. 10 is a top view of the spring for maintaining the movable member in elevated position. Fig. 11 is an enlarged detached view of the angular pawl. Fig. 12 is a fragmentary section on line $e\,e$, Fig. 3. Fig. 13 is a fragmentary section on line $f\,f$, Fig. 5. Fig. 14 is a vertical longitudinal section through another form on line $g\,g$, Fig. 15. Fig. 15 is a vertical transverse section through another form on line $h\,h$, Fig. 14.

In referring to the drawings for the details of construction like numerals designate like parts.

The advertising mechanism is inclosed within a case, upon the top of which is arranged the check-protecting mechanism, the movable member of which is operatively connected by a system of levers and pawl-and-ratchet mechanism to the advertising mechanism. The inclosing case is preferably constructed or cast in three pieces, which when assembled are fastened by a single screw. These pieces comprise the front 1, having the two sides 2 cast integral therewith, the back 3, having the top 4 cast integral therewith, and the bottom 5. The sides 2 are each provided with bottom lugs or hooks 6, which fit through slots 7 in the bottom 5, substantially as shown in Fig. 13, and the top 4 has one or more lugs or hooks 8, which catch beneath the bar 9. (See Fig. 4.) A vertical lug 10 projects up from near the rear of the bottom, and a screw 11 is passed through the back 3 and into the lug 10 to fasten the parts in assembled position.

The check-protecting mechanism is composed of a fixed member or plate 12, which is mounted on the top of the inclosing case, near the front thereof, and a movable member or lever 13, which is pivoted near the rear of the case to ears 14, projecting up from the top 4. The top surface of the plate 12 is roughened or checked, and a correspondingly roughened or checked plate 15 is secured to the front of the lever 13 and vertically above the plate 12. The roughened or checked faces of these plates are shown in Figs. 6 and 8.

The front 1 of the case is provided with a series of windows 16, behind which advertisements pass, and a series of windows 17 at one side of the windows 16, which are arranged in front of the calendar dates.

The inclosing case is preferably divided into two compartments—one for the advertising mechanism and the other for the calendar mechanism—by a vertical partition 18, which is supported in place by fitting its top and bottom edges in grooves in the top and bottom of the case, as shown in Fig. 5.

The advertising mechanism has a main roller 19, of comparatively large circumference, and a series of small rollers arranged at different points, and an endless band 20 is supported by and passes over these rollers, on which a plurality of advertisements are printed, or they may be printed on separate strips and affixed to the band in any well-known way. A flat plate 21 is arranged in the rear of the windows 16, in front of which the band passes, so that the advertisements will be properly displayed. The upper and lower edges of this plate are rounded to prevent cutting or tearing the band, substantially as shown in Fig. 4. The small rollers heretofore referred to are preferably located substantially as shown in Fig. 4. A roller 22 is placed between the lower edge of the plate 21 and the main roller 19, which is in the lower left-hand corner of the inclosing case. Another roller 23 is arranged above and slightly in front of the axis of the main roller 19, which supports that portion of the band between itself and the roller 22 around the main roller 19. A roller 24 is placed in the upper left-hand corner of the inclosing case, with its upper surface slightly above and in the rear of the top edge of the plate 21, and two rollers 25 and 26 are arranged in the rear of the inclosing case. The band 20 is turned up from time to time to change the advertisements displayed through the windows by mechanism actuated from the movable member of the check-protecting mechanism. In the form shown in Figs. 1 to 13, inclusive, this advertisement-changing mechanism consists of a short vertical rod 27, which projects through an opening 28 in the top of the inclosing case, has a forked upper end, the members 29 of which are fitted upon opposite sides of the movable member or lever 13 and pivoted to said member by a pivot-pin 30, a substantially horizontal transversely-extending rock-bar 31, a vertical connecting-rod 32, a pawl 33, and a ratchet-wheel 34, fixed to one side of the main roller. The transverse rock-bar 31 is pivoted at or near its center between ears 35, depending from the top of the inclosing case, and at its respective ends to the rod 27 and the connecting-rod 32 and extends above the advertising-band and its supporting-rollers, so as not to interfere with the action of the same. The connecting-rod 32 extends in close proximity to one side of the inclosing case and between said side and the band-supporting rollers, so as to avoid interference with the same. (See Fig. 5.) The pawl 33 is of angular form, substantially as shown in Fig. 11, and is what I term a "goose-pawl," and is pivoted to the side of the inclosing case by a pin 36, which passes through the opening 37 in the pawl, and to the lower end of the connecting-rod by a pin 38, which passes through the opening 39 in the pawl. The operation of this form of mechanism will be easily understood by referring to Figs. 4 and 5. The movable member or lever of the check-protecting mechanism upon being depressed carries the rod 27 down with it. This rocks the bar 31 and elevates the connecting-rod 32, which in turn rocks the pawl 33 on its pivot, moving its upper extremity forward and turning the ratchet-wheel 34.

In connection with my improvement I preferably form a calendar mechanism which consists of a plurality of rollers having knurled turning-knobs on which flexible strips of paper, cloth, or the like provided with the various dates are supported. Referring to Figs. 3 and 5, this mechanism is preferably arranged as follows: A plate 40 is placed in the rear of the upper window of the calendar-compartment, and two rollers 41 and 42 are arranged at suitable points in the rear of this plate. A flexible strip 43, on which the days of the week are printed or otherwise formed, is wound partially on each of these rollers and passes between the upper window and the plate 40. A plate 44 is placed in the rear of the intermediate window, and two rollers 45 and 46 are arranged in the rear of the plate at suitable points, on which a flexible strip 47, having the names of the months thereon, is partially wound. The strip 47 passes between the intermediate window and the plate 44. A similar plate 48 is arranged in the rear of the lower window, and two rollers 49 and 50 are placed in the rear of the plate 48, on which a flexible strip 51, having the days of the month thereon, is partially wound. The dates are easily changed by turning the enlarged knurled projecting knobs 52 of the rollers.

In the form of the advertisement-changing actuating mechanism shown in Figs. 14 and 15 the movable member or lever of the check-protecting mechanism is provided with a downwardly-extending enlargement 53, the rear surface 54 of which is beveled or inclined. A recess or opening 55 is formed in the enlargement 53, in which a roller 56 is mounted, as shown in Fig. 14. A rock-shaft 57 is journaled in the depending bearing-pieces 58, and a crank 59 extends at or near the inner end of the shaft 57, which has a correspondingly-beveled front surface 60, on which the roller 56 is adapted to roll. A spiral spring 61 is arranged in the rear of the crank 59 and in the opening 62 in the top of the inclosing case, through which the crank 59 and enlargement 53 extend, the rear end of the opening being tensioned against the rear wall of the opening 62, as shown in Fig. 14. The purpose of the spring is to normally maintain the crank 59 in its forward position. A longer crank 63 projects from at or near the outer extremity of the shaft and extends between the rollers and the side of the case down to a point in the rear of the main roller 19. A pawl 64 is pivoted to the lower end of the crank 63 and engages with the teeth of the ratchet-wheel 34. The outer or tooth-engaging end of the pawl is preferably provided with a bumper 65, of rubber or other elastic or yielding material, to lessen the shock. The cushion or bumper is shown in dotted lines in Fig. 15. The pawl is yieldingly held in engagement with the teeth in the ratchet-wheel by a spring 66. The movable member or lever is automatically returned in its elevated position after it has been depressed by a spring 67, preferably of the V shape shown in Figs. 9 and 10.

The operation of the form shown in Figs. 14 and 15 is as follows: The movable member or lever being depressed, the roller presses against the crank 59 and rocks the shaft 57. This turns the longer crank 63 and moves the pawl forward, which engages the teeth and turns the ratchet. The arrangement of the calendar at one side of and in close proximity to the advertisements serves to more thoroughly attract attention to the advertisements, as a person viewing the calendar will necessarily also see the advertisements.

I claim as my invention—

1. The combination with the casing formed in its upper wall with an opening, a plate secured to the top of the said casing, and a pivoted member coacting with the said plate, of the advertising means arranged in the said casing, a rock-arm mounted in the said casing, means projecting through the said opening of the casing for actuating the said rock-arm, said means being operated by the said pivoted member, and means actuated by the said rock-arm for actuating the said advertising means.

2. The combination with the casing formed with openings, of a belt passing in rear of the said openings, rollers journaled in the said casing over which the said belt passes, a ratchet-wheel secured to the shaft of one of the said rollers, an arm pivotally mounted in the said casing, an arm pivoted to the said first-named arm, and projecting through the top wall of the said casing, means arranged on top of the said casing for actuating the said last-named arm, and means pivoted to the first-named arm for engagement with the said ratchet-wheel.

3. In a device of the class described, an inclosing case, advertising mechanism within said case, having a plurality of rollers, the case having formed therein openings, a belt passing in rear of said openings, rollers journaled in said case over which said belt passes, a ratchet-wheel secured to the shaft of one of said rollers, an arm pivotally mounted in said case, a rod pivoted to said arm and projecting up through the case, a check-protecting mechanism mounted on the top of said case, and having a fixed member and a movable member, one end of said rod pivotally secured to said movable member, and means pivoted to the other end of said arm for engagement with said ratchet-wheel.

4. In a device of the class described, the combination with a casing having formed therein openings, a plate secured to the top of said casing, and a pivoted member coacting with said plate, of a belt passing in rear of said openings, rollers journaled in said casing over which said belt passes, a ratchet-wheel secured to the shaft of one of said rollers, an arm pivotally mounted in said casing, a rod pivoted to said arm and projecting through the top wall of said casing and pivotally connected to said pivoted member, and a pawl operatively connected to the other end of said arm and adapted to engage with said ratchet-wheel.

5. In a device of the class described, the combination with a casing having formed therein openings, a belt passing in rear of said openings, rollers journaled in said casing over which said belt passes, a ratchet-wheel secured to the shaft of one of said rollers, an arm pivotally mounted in said casing, and an arm pivoted to the first-named arm, and projecting through the top wall of the said casing, of a check-protecting mechanism mounted on the top of said casing, and having a fixed member and a movable member, the last-named arm pivotally secured to said movable member, and a pawl actuated by the first-named arm for engagement with said ratchet-wheel.

6. In a device of the class described, an inclosing case having an opening in its front, a belt carrying advertisements passing in the rear of said opening, rollers journaled in said case over which said belt passes, a ratchet-wheel secured to the shaft of one of said rollers, an arm pivotally mounted in said case, a rod connected to said arm and projecting up through the case, a check-protecting mechanism mounted on the top of said case and having a fixed member and a movable member, one end of said rod being pivotally secured to said movable member, and means having operative connection to said arm and adapted to engage with said ratchet-wheel.

7. The combination with a casing provided with an opening and a check-protecting mechanism having a fixed member on the top of said casing, and a pivoted member coacting with the said fixed member, of the advertising means arranged in the said casing, a rock-arm mounted in the said casing, means projecting through the said opening of the casing for actuating the said rock-arm, said means being operated by the said pivoted member, and means actuated by the said rock-arm for actuating the said advertising means.

8. The combination with a casing having an opening, and an advertising means arranged therein, of a check-protecting mechanism having a fixed member arranged on top of said casing and a movable member coacting with said fixed member, and means actuated by the said movable member for actuating the said advertising means and including a part projecting through the opening in the casing into connection with the movable member.

ALBERT A. ROOT.

Witnesses:
A. J. SANGSTER,
L. M. SANGSTER.